No. 780,508. PATENTED JAN. 24, 1905.
J. M. KING.
SEED SEPARATOR.
APPLICATION FILED SEPT. 28, 1904.
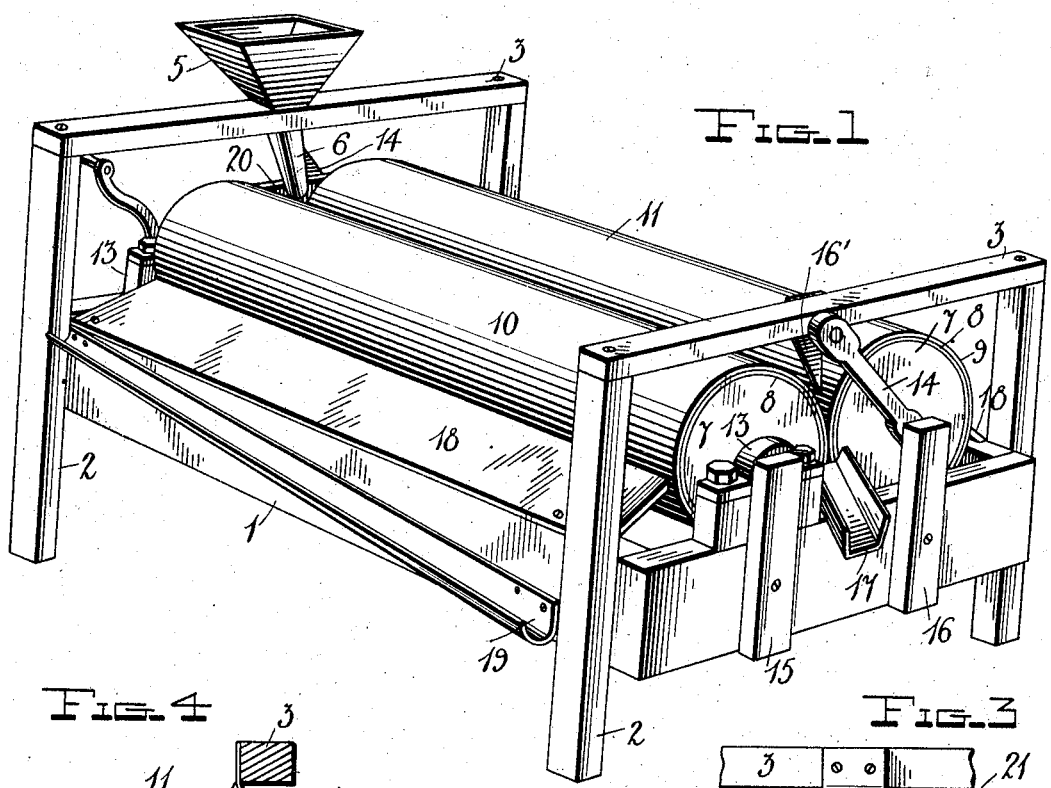
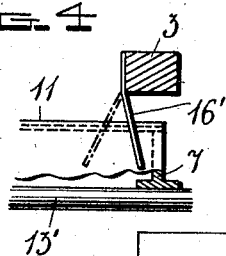
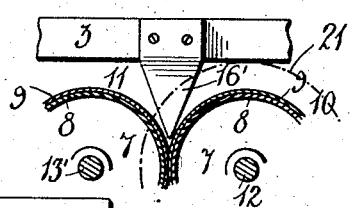
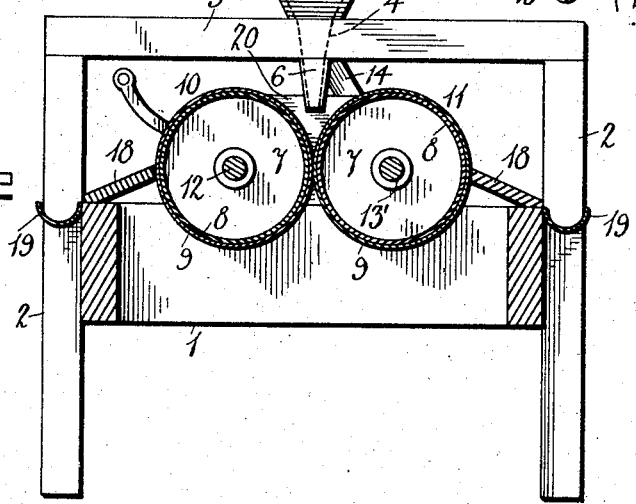
Witnesses
Inventor
James M. King
By
Andley, Browne & Norton
Attorneys No. 780,508. Patented January 24, 1905.

UNITED STATES PATENT OFFICE.

JAMES M. KING, OF ROCHESTER, MINNESOTA.

SEED-SEPARATOR.

SPECIFICATION forming part of Letters Patent No. 780,508, dated January 24, 1905.

Application filed September 28, 1904. Serial No. 226,307.

*To all whom it may concern:*

Be it known that I, JAMES M. KING, a citizen of the United States, residing at Rochester, in the county of Olmsted and State of Minnesota, have invented certain new and useful Improvements in Seed-Separators; and I do hereby declare the following to be a full, clear, and exact description of the invention, such as will enable others skilled in the art to which it appertains to make and use the same.

This invention relates to improvements in seed-separators; and the object of the invention is to provide a machine adapted more especially for the separation of buckhorn-seed from clover-seed, the separation of these seeds having heretofore been made difficult by reason of the approximate uniformity of size and weight of the two mentioned seeds. Clover-seed is approximately of uniform cross-section throughout, whereas buckhorn-seed has a face of concave or cup-shaped form in cross-section and is equipped at one end with a surface capable of adhering to a contacting object. In the production of the present machine I have taken advantage of the structural differences of the two stated seeds with the purpose of effecting complete separation regardless of the comparative weight and size of the respective material.

The nature of my invention will be readily comprehended, reference being had to the following detailed description, and to the accompanying drawings illustrating the machine in its preferred form of embodiment, it being understood that various modifications may be made therein without exceeding the scope of the concluding claim.

In the drawings, Figure 1 is a perspective view of a seed-separator embodying my invention. Fig. 2 is a cross-sectional view viewed in the direction of the feed end of the machine. Fig. 3 is a detailed view, partly broken away and viewed in the direction of the discharge end of the machine. Fig. 4 is a detailed view of the discharge ends of the rolls.

Referring to the drawings by numerals, 1 designates the frame of rectangular form supported by corner-posts 2, the posts at the feed end of the machine being relatively higher than the posts at the discharge end of the machine, whereby the separating-rolls, presently to be described, are given an inclination. Said posts extend above the frame and are connected by cross-pieces 3, the cross-piece at the feed end of the machine being provided with an aperture 4 for the passage of seed delivered from a hopper 5, supported on said cross-piece. The seed delivered from the hopper through the opening in the front cross-piece discharges from a spout 6 between the two rolls, each of which is preferably constructed of end heads 7, a sheet-metal or other cylinder 8, and a textile or other covering 9. The rolls, which are respectively numbered 10 and 11, are inclined from the feed end downwardly to the delivery end, and a shaft 12 of the roll 10 is journaled in stationary bearings 13 and is driven by a hand-crank or, if preferred, by other power. The shaft 13' of the other roll is supported at its ends by arms 14, each of which is loosely pivoted on the respective cross-bar 3, whereby the roll 11 is caused to contact throughout its length with the surface of the roll 10 and by such contact is rotated in a direction opposite to the latter. The respective longitudinal positions of the said rolls are maintained by the employment of thrust-blocks 15 16, against which the shafts 12 and 13' bear, and endwise movement of the rolls is thereby permitted.

Near the discharge ends of the rolls is a V-shaped plate 16', secured to the rear cross-piece and extending between the rolls close to the point of contact. At the point of contact of said roll is a discharge-spout 17 for the clover-seed, at which may be placed a suitable receptacle to receive such seed. In the operation of the machine the buckhorn and clover seed are deposited in the hopper and are discharged from the spout 6 between the contacting rolls, and said rolls being set in motion and rotated in opposite directions the clover-seed is caused to move rearward between said rolls to and through the discharge-spout 17, whereas the buckhorn-seed, by reason of their peculiar formation and the presence of the adhering surface thereon, are caused to cling to the outer covering of the roll and after passing thereover are deposited on side plates 18 and from thence fall into inclined delivery-troughs 19, from which latter they fall into suitable receptacles. The separation of the two kinds of seeds mentioned depends upon the positioning of the buckhorn-seeds with the concave face downwardly, and in order to retard the movement of the seeds to permit of the stated position of the seeds of the buckhorn variety I provide the V-shaped plate 16', which, as above stated, is arranged between the rolls toward the delivery end of the latter. This plate is of a material which will permit of its being bent to assume any position between that shown in full and that shown in dotted lines in Fig. 4, the object of the adjustment of said plate being to regulate the downward movement of the seed between rolls and to retard such movement sufficiently to enable the buckhorn-seed to assume the inverted position, as above set forth. This retarding-plate therefore constitutes an important feature of the invention, inasmuch as by its use the movement of the seed is retarded until the buckhorn-seed shall have become inverted, whereupon the adhesive end of said seed will cling to the surface of the roll and will effect the separation of said seed from the clover-seed. My invention is not directed to any particular material for the surface of the roll, as obviously any material which will obtain adherence between it and the buckhorn-seed will answer the purpose.

The clover-seed being of smooth exterior will not adhere to the surface of the rolls, and hence will be carried beneath and at the sides of the V-shaped plate 16' and will be discharged at the end of the machine through the spout 17.

To prevent discharge of the seed over the rolls at the feed end thereof there is provided a plate 20, extending across both rolls close to the ends and serving as a wall against which the seed are banked. In lieu of this plate a disk 21 (see dotted lines in Fig. 3) may be secured on the feed end of the drive-roll, the diameter of the disk being sufficient to overlap the other roll, as shown.

I claim as my invention—

In a separator for clover and buckhorn seeds, the combination of an inclined frame, a pair of rolls each of which is provided with a textile or equivalent covering, a hopper arranged to deliver the seed at one end of said roll, a spout arranged to discharge clover-seed at the other end of the rolls, a plate intermediate of the discharge ends of the rolls for retarding the movement of the seed, and means at the sides of the rolls for collecting and discharging the buckhorn-seeds.

In testimony whereof I affix my signature in presence of two witnesses.

JAMES M. KING.

Witnesses:
 FRANK M. DUDLEY,
 EVAN SCOTT